(12) United States Patent
Schneider et al.

(10) Patent No.: US 8,464,312 B1
(45) Date of Patent: Jun. 11, 2013

(54) INTEGRATED NETWORK POLICY ENFORCEMENT

(75) Inventors: Herb Schneider, Los Altos, CA (US); Nick G. Suizo, San Jose, CA (US)

(73) Assignee: Extreme Networks, Inc., Santa Clara, CA (US)

( * ) Notice: Subject to any disclaimer, the term of this patent is extended or adjusted under 35 U.S.C. 154(b) by 647 days.

(21) Appl. No.: 12/147,441

(22) Filed: Jun. 26, 2008

Related U.S. Application Data

(60) Provisional application No. 60/947,359, filed on Jun. 29, 2007.

(51) Int. Cl.
H04L 29/06 (2006.01)

(52) U.S. Cl.
USPC .......................................................... 726/1

(58) Field of Classification Search
None
See application file for complete search history.

(56) References Cited

U.S. PATENT DOCUMENTS

| | | | | |
|---|---|---|---|---|
| 6,789,202 | B1 * | 9/2004 | Ko et al. | 726/23 |
| 7,451,488 | B2 * | 11/2008 | Cooper et al. | 726/25 |
| 7,694,115 | B1 * | 4/2010 | Porras et al. | 713/1 |
| 7,808,897 | B1 * | 10/2010 | Mehta et al. | 370/230 |
| 7,818,790 | B1 * | 10/2010 | Burns et al. | 726/7 |
| 2002/0073338 | A1 * | 6/2002 | Burrows et al. | 713/201 |
| 2005/0235360 | A1 * | 10/2005 | Pearson | 726/23 |
| 2006/0069912 | A1 * | 3/2006 | Zheng et al. | 713/151 |
| 2007/0234402 | A1 * | 10/2007 | Khosravi et al. | 726/2 |
| 2007/0256128 | A1 * | 11/2007 | Jung et al. | 726/24 |

OTHER PUBLICATIONS

Extreme Networks, "Press Release: Reconnex and Extreme Networks Team up to Provide Real-Time Security Enforcement Across the Network", http://www.extremenetworks.com/about-extreme/press2006/pr09_19_06.aspx, (Sep. 19, 2006), printed on Jun. 26, 2008, 1-2.

* cited by examiner

*Primary Examiner* — Hadi Armouche
*Assistant Examiner* — Malcolm Cribbs
(74) *Attorney, Agent, or Firm* — Blakely, Sokoloff, Taylor & Zafman

(57) ABSTRACT

A method and system for integrating network policy enforcement into an existing network infrastructure comprises a communications bus that links expert policy devices, such as intrusion prevention devices, with one or more connection points. The connection points are network devices that are equipped with enforcement logic for receiving reports of events via a published interface on the communications bus about the existing network infrastructure from either the policy devices or the connection points themselves, and enforcing policy at the connection points by generating an action in response to the reported events, including actions to block traffic, remediate devices, limit bandwidth, and the like, until the reported event has been addressed in a manner that ensures the security of the existing network infrastructure.

13 Claims, 5 Drawing Sheets

*100 – INTEGRATED NETWORK POLICY ENFORCEMENT OVERVIEW*

INTEGRATED NETWORK POLICY ENFORCEMENT

CROSS-REFERENCE TO RELATED APPLICATION

This application is a continuation of and claims priority to U.S. Provisional Patent Application No. 60/947,359, filed on Jun. 29, 2007 entitled "INTEGRATED NETWORK POLICY ENFORCEMENT."

TECHNICAL FIELD

The present invention relates to the field of computer networks and internetworking communications technologies. In particular, the present invention relates to network policy enforcement.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 2008, Extreme Networks, Inc., All Rights Reserved.

BACKGROUND

Today's networks must support an ever-growing community of Internet and mobile users that demand access to a broad variety of network resources, including voice, video and data applications provided over the network. At the same time, networks have come under an increasing number of cyber-attacks that not only compromise the security of network resources but also prevent access by legitimate users. As a consequence, there are enormous pressures on network administrators to provide bulletproof security and foolproof access control, while at the same time delivering high availability voice-quality connections that are easy to manage, so that no matter what type of method is used to access the network, whether it be wired or wireless, private information and network resources remain secure.

The difficulties associated with securing a network have existed ever since computer networks were first introduced. Over the years a variety of techniques have been employed to provide network security. Some of these techniques are applied to communications between network nodes, i.e., at the edge of the network, whereas others are applied to communications between connection points, i.e., at the core of the network. A network node generally refers to an end point for data transmissions, such as a computer workstation, wireless access point (AP), or application server, whereas a connection point generally refers to an intermediate point in the network, such as a router, hub, or a switch.

A common approach to securing a network is to add security devices to the network as in-line devices that work independently of the network infrastructure. There are several disadvantages to this approach. One problem is that a failure of the in-line security device causes a disruption to the network. Another is that it requires the security devices to be inserted into the network on as many links between the network nodes and connection points as possible to get the greatest benefit of security protection. Adding a sufficient number of in-line devices to the network is prohibitively expensive. As a result, security devices are typically only added to critical parts of the infrastructure, leaving other parts of the infrastructure vulnerable to attack. Similar problems exist in the enforcement of other kinds of policy enforcement besides security enforcement.

SUMMARY

Embodiments of the present invention include a method and system for integrating network policy enforcement into an existing network infrastructure by providing a communications bus having a published interface to facilitate communications between policy devices and connection points. The policy devices and connection points collaborate in the enforcement of policy on the network including, among other types of enforcement, conditionally blocking or limiting network traffic and remediating devices in the network.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION

In the following paragraphs various aspects of the present invention, a method and system to control a network by integrating policy enforcement into an existing network infrastructure, will be described. Specific details will be set forth in order to provide a thorough understanding of the present invention. However, it will be apparent to those skilled in the art that the present invention may be practiced with only some or all of the described aspects of the present invention, and with or without some or all of the specific details. In some instances, well known architectures, steps, and techniques have not been shown to avoid unnecessarily obscuring the present invention. For example, specific details are not provided as to whether the method, system and apparatus is implemented in a router, bridge, server or gateway, or as a software routine, hardware circuit, firmware, or a combination thereof.

Parts of the description will be presented using terminology commonly employed by those skilled in the art to convey the substance of their work to others skilled in the art, including terms of operations performed by a computer system, switch, or other network device, and their operands. As well understood by those skilled in the art, these operands take the form of electrical, magnetic, or optical signals, and the operations involve storing, transferring, combining, and otherwise manipulating the signals through electrical, magnetic or optical components of a system. The term system includes general purpose as well as special purpose arrangements of these components that are standalone, adjunct or embedded.

Various operations will be described as multiple discrete steps performed in turn in a manner that is most helpful in understanding the present invention. However, the order of description should not be construed as to imply that these operations are necessarily performed in the order they are presented, or even order dependent. Lastly, reference throughout this specification to "one embodiment," "an embodiment," or "an aspect," means that the particular feature, structure, or characteristic that is described is included in at least one embodiment of the invention, but not necessarily in the same embodiment. Furthermore, the particular features, structures, or characteristics may be combined in any suitable manner in one or more embodiments.

Figure 1:
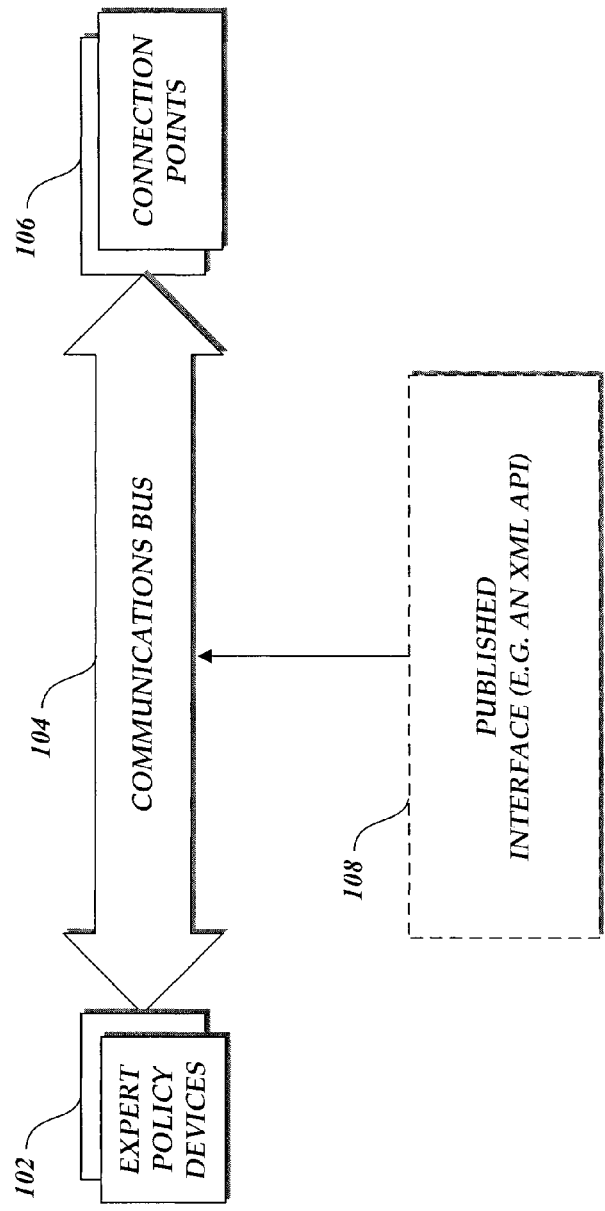
FIGS. 1-3 are block diagram overviews illustrating certain aspects of integrating enforcement of network policy into a network infrastructure in accordance with one embodiment of the invention.

With reference to FIG. 1 illustrating an integrated network policy enforcement overview 100, a communications bus 104 between a device that detects policy violations, i.e., a policy device 102, and a connection point 106 is established to facilitate two-way communications between the policy device and the connection point. In a typical embodiment, the two-way communications between the policy device 102 and the connection point 106 are facilitated through the use of a published interface 108 for the communications bus 104, using a universal standard, such as the eXtensible Markup Language, or XML. The policy device 102 may be any device capable of making a determination about traffic for purposes of a network policy, including security purposes, such as intrusion prevention and detection, and legal purposes, such as misuse of electronic mail, file sharing, and other services available over the network. The connection point 106 may be any network device that controls traffic in a network, such as a switch or router.

Figure 2:
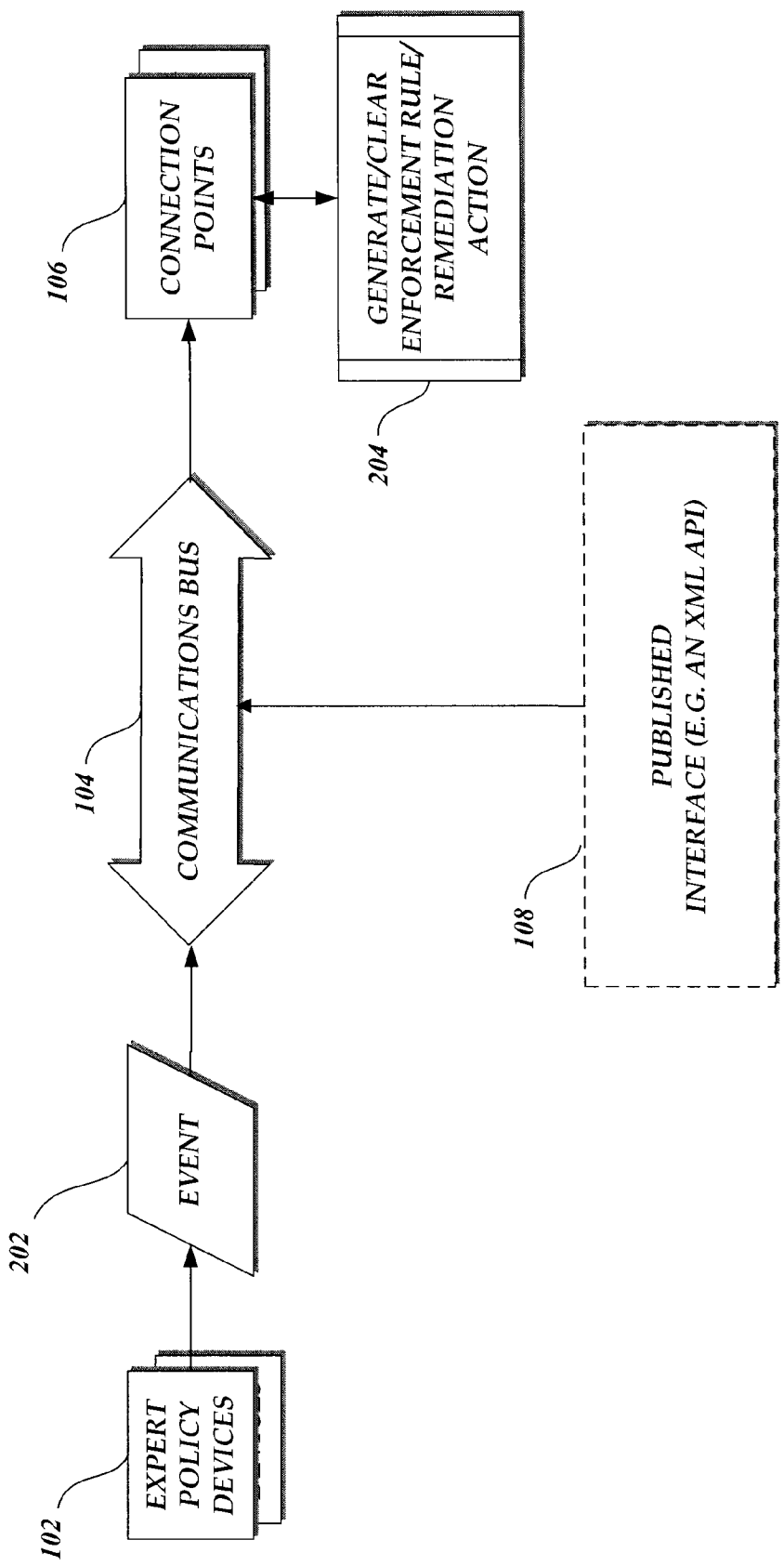

In one embodiment, the policy device 102 probes the connection point 106 to import information about topology, connected devices, device behavior, and the like. Likewise, the connection point 106 probes the policy device 102 to determine the presence of suspicious behavior in the network indicative of a policy violation. With reference to FIG. 2, in one embodiment, the policy device reports high-level events 202 that might indicate, for example, whether a particular Internet Protocol (IP) address is behaving in a way that threatens the security of the network. The connection point 106 may use this report to create enforcement rules 202, such as an access control list (ACL), to block the threat.

Examples of enforcement actions 202 that the connection point 106 might take when enforcing the rule include, among others, blocking the flow of traffic to/from that IP address, conditionally blocking specific types of traffic, based on IP Port numbers or other filters, and/or limiting the traffic using an ACL rule that includes a bandwidth limitation, such as a quality of service bandwidth rate limit rule. The advantage of conditionally blocking or limiting the traffic is to allow connectivity but not allow destructive behavior that might affect the rest of the network.

An alternative action is to isolate the IP address/node/device by moving it to a connection point 106 where the unit is remediated and the problem/infection/virus/security violation is repaired. Such actions can be applied to end points resulting from either wireless and wired connections to the network.

In one embodiment, the XML Applications Program Interface (API) may be used to publish an interface 108 to the communications link 104 between the policy device 102 and the connection point 106. In the past, many security devices attempted to use a Command Line Interface (CLI) script to facilitate the communication between the device 102 and the network infrastructure that the device was attempting to control. However, this approach required knowledge of which version of the CLI and the underlying software was being used on the connection point 106. When a CLI to the connection point 106 changed, the policy device 102, such as a security device, communicating with the connection point 106, such as a switch, had to change to accommodate the new CLI's. In contrast, an XML API standardizes the communications between the policy device 102 and the connection point 106 in a manner that is not vendor-specific. In addition, the use of an XML API facilitates coordinating multiple policy devices 102 to collaborate on network actions 204.

An example of such a collaborative approach is an Intrusion Prevention Device (IPD) detecting a security violation such as worm or virus propagation. In one embodiment, an IPD, i.e. the policy device 102, sends an XML encoded message that reports the event 202 via the communications bus 104 to a connection point 106, such as a switch, which, in turn, creates an ACL 204 to block that traffic. The switch 106 then communicates an XML encoded message to a remediation device that can scan the end point in which the security violation occurred, and return it to the network only when it has been remediated, tested and determined to be infection free. As the end point device is allowed back on the network, the switch, i.e., the connection point 106 removes the ACL 204 and also instructs the IPD, i.e., the policy device 102 to remove any of its own rules for blocking traffic from the end point prior to remediation.

In one embodiment, the communications bus 104 allows disparate policy devices 102 to collaborate using a universal language and combine their specific expertise in a coordinated response to network security events 202. The communications bus 104 facilitates scaling the number of policy devices 102 in the network by aggregating multiple policy devices 102 in communication with a connection point 106, and/or multiple connection points 106 in communication with a policy device 102.

Figure 3:
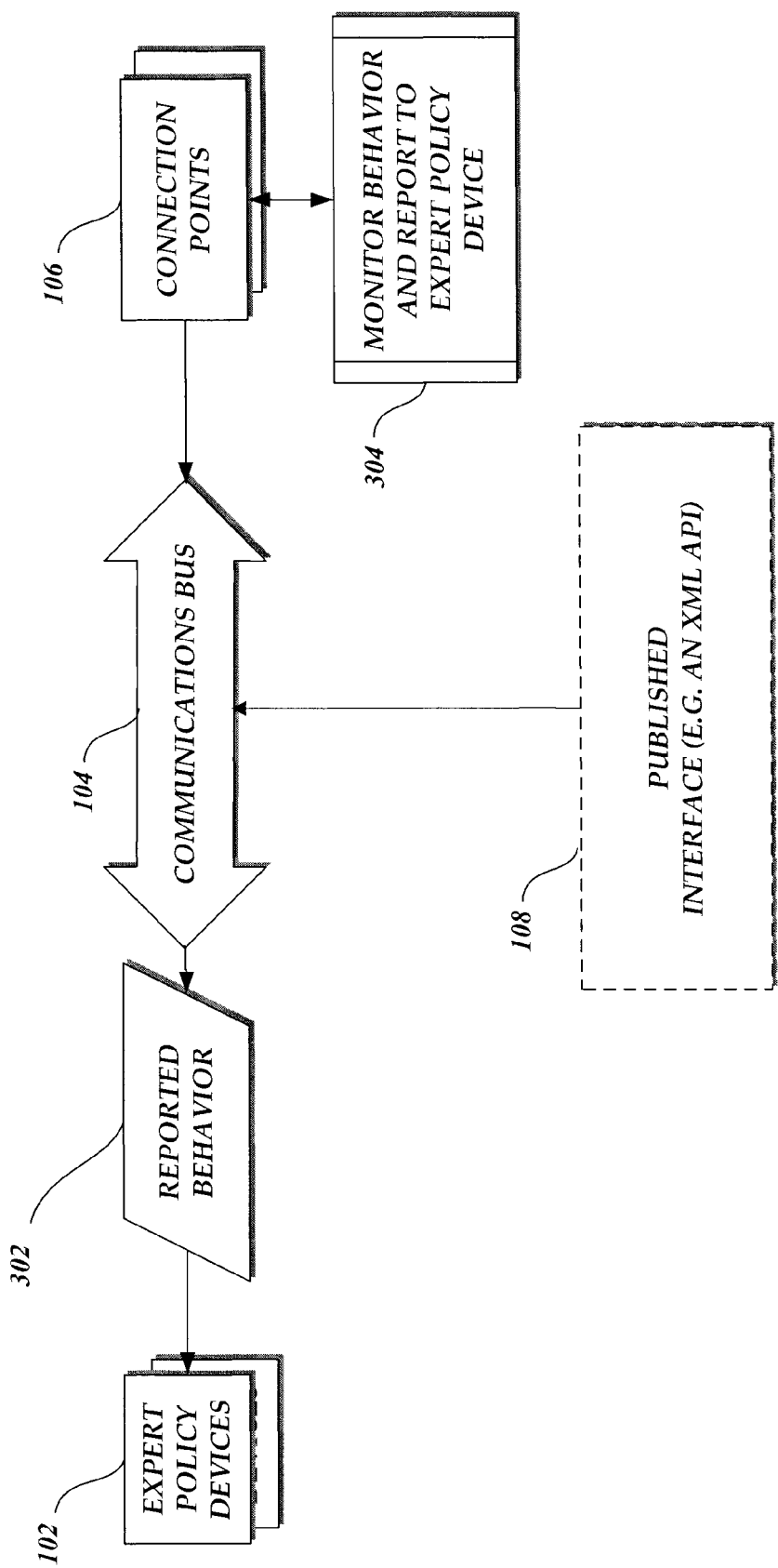

With reference to FIG. 3, in one embodiment, the connection points 106 also have the capability to monitor 302 behavior of end points and applications, and to determine if they are behaving within a range that appears normal, or if their behavior constitutes a risk to the network. An example of this is an attached node suddenly having a large increase in bandwidth demand, or sending out SMTP messages, or using IP port numbers (traffic types) associated with worms/viruses/netbots. This information can then be used to communicate with an IPD, i.e., the policy device 102 on the network by reporting the behavior 304 so that the IPD 102 can more closely monitor the traffic and determine with the IPD expert precision whether there is a possible threat. If the IPD 102 determines the presence of a threat, it would then communicate with the switch, i.e., the connection point 106 to block the communication (e.g., blocking all traffic, traffic for specific port numbers or limiting traffic bandwidth through quality of service changes). In one embodiment, the connection point 106 can also embed behavior rules 204 as described with reference to FIG. 2, and encode them as ACL rules to qualify network behavior 304 as a security event 202.

Figure 4:
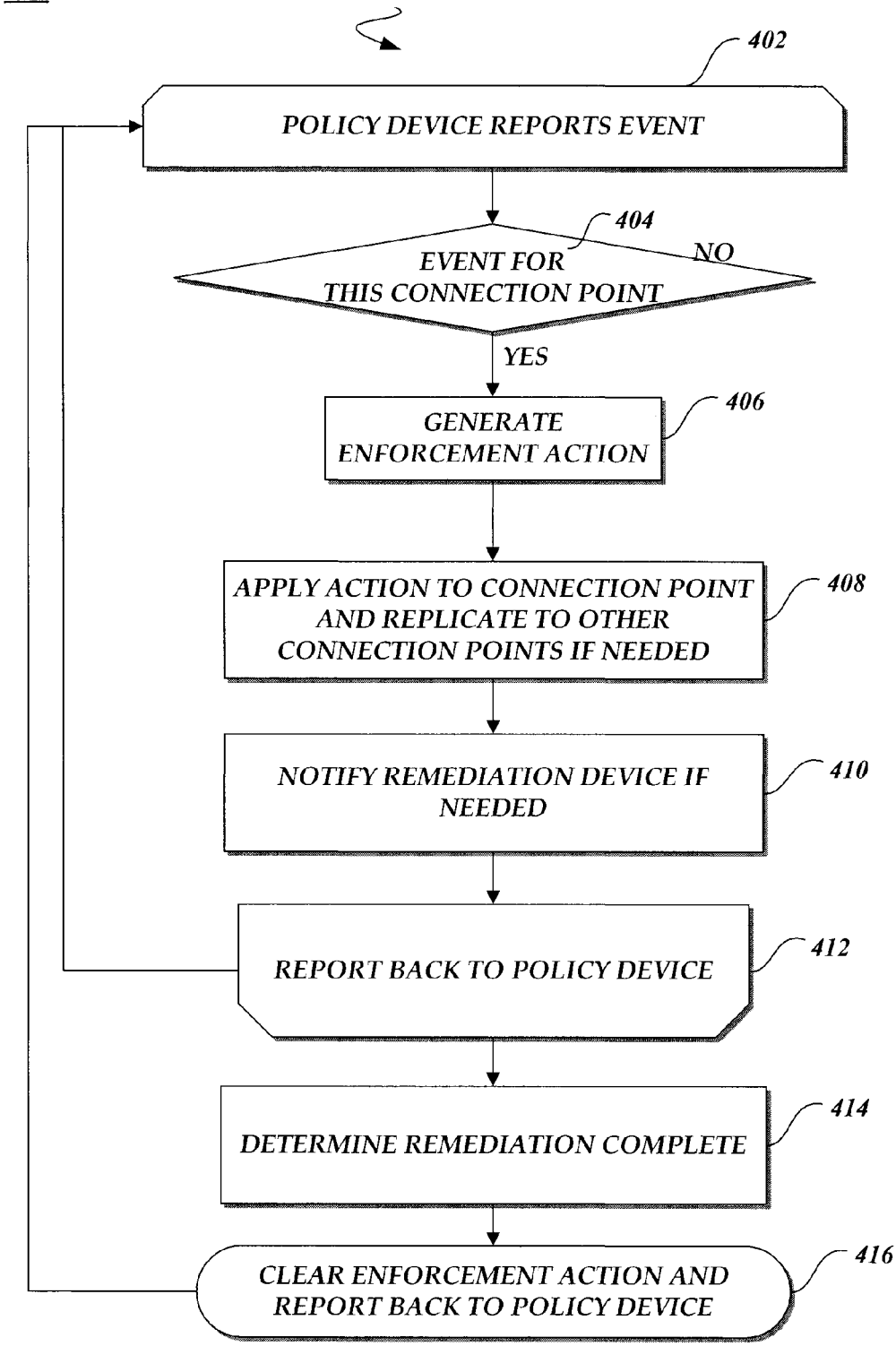
FIG. 4 is a flow diagram overview illustrating an example of certain aspects of a method for integrating enforcement of network policy into a network infrastructure in accordance with one embodiment of the invention.

With reference to the flow diagram in FIG. 4, an embodiment of a method 400 to integrate network policy enforcement into an existing network infrastructure has been illustrated. As shown, at process block 402 a policy device 102 reports an event 202 to one or more connection points 106. The connection points 106 in turn determine 404 whether the event 202 is relevant to their traffic and, if so, they generate and enforcement action 204 at process block 406. The connection point(s) 106 then apply the action to the connection point 106 and replicate to other connection points 106 as needed at process block 408. In addition, in some embodiments, at process block 410 the connection points 106 may notify a remediation device on the network whether remediation is needed, and at process block 412, report back to the policy device 102 regarding the actions/remediation. At process block 414, the method 400 continues; in one embodiment, the connection points 106 determine that remediation is complete, and the connection points 106 in turn clear any outstanding enforcement actions and report back to the policy device 416. In this manner, the policy devices 102 and connection points 106 advantageously collaborate to provide an integrated approach to policy enforcement on the network.

Figure 5:
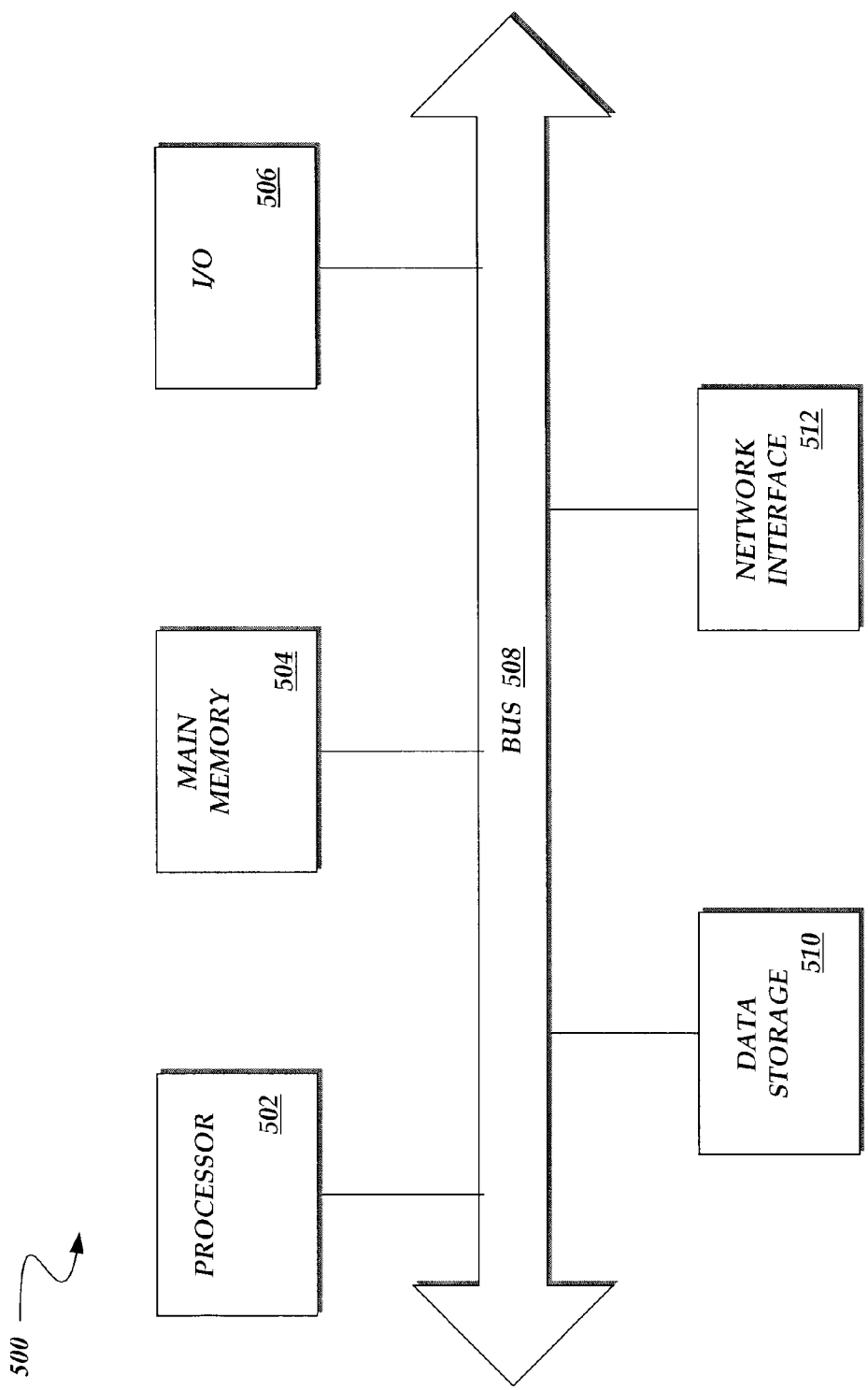
FIG. 5 illustrates one embodiment of a suitable computing environment in which certain aspects of the invention illustrated in FIGS. 1-4 may be practiced.

FIG. 5 illustrates one embodiment of a suitable computing environment in which certain aspects of the invention illustrated in FIGS. 1-4 may be practiced. As shown, a method and system for integrating network policy enforcement into an existing network infrastructure in accordance with an embodiment of the invention may be implemented on a computer system 500 having components 502-512, including a processor 502, a memory 504, an Input/Output device 506 a data storage 510, and a network interface 512, coupled to each other via a bus 508. The components perform their conventional functions known in the art and provide the means for implementing integrated network policy enforcement as described and illustrated in FIGS. 1-4. Collectively, these components represent a broad category of hardware systems, including but not limited to general purpose computer systems, servers, switches, routers, hubs and other specialized packet-forwarding devices.

In one embodiment, the memory component 504 may include one or more of random access memory (RAM), and nonvolatile storage devices (e.g., magnetic or optical disks) on which are stored instructions and data for use by processor 502, including the instructions and data that comprise the generated enforcement rules 204, and the various functions embodied in logic of the published interface 108 of the communications bus 104 as well as the functions embodied in the logic of the connection points 106 when generating the enforcement rules and actions 204 as well as monitoring behavior 302 and reporting the behavior back to the policy devices 102. In one embodiment, the network interface component 512 may include the ports of a connection point 106.

It is to be appreciated that various components of computer system 500 may be rearranged, and that certain implementations of the present invention may not require nor include all of the above components. Furthermore, additional components may be included in system 500, such as additional processors (e.g., a digital signal processor), storage devices, memories, network/communication interfaces, etc.

In the illustrated embodiment of FIG. 5, a method and system for integrating network policy enforcement into an existing network infrastructure in accordance with an embodiment of the invention as discussed above may be implemented as a series of software routines executed by computer system 500. The software routines may comprise a plurality or series of instructions, code sequences, configuration information, or other data to be accessed and/or executed by a processing system such as one or more of processor 502. Initially, the series of instructions, code sequences, configuration information, or other data may be stored on data storage 510 and transferred to memory 504 via bus 508.

It is to be appreciated that the series of instructions, code sequences, configuration information, or other data can be stored a data storage 510 using any computer-readable or machine-accessible storage medium, such as a diskette, CD-ROM, magnetic tape, DVD, ROM, etc. It is also to be appreciated that the series of instructions, code sequences, configuration information, or other data need not be stored locally, and could be stored on a remote storage device, such as a server or other network device on a network, and received on the system 500 via a network/communication interface 512. The instructions, code sequences, configuration information, or other data may be copied from the data storage 510, such as mass storage, or from the remote storage device into memory 504 and accessed and executed by processor 502.

In alternate embodiments, the present invention is implemented in discrete hardware or firmware. For example, one or more application specific integrated circuits (ASICs) could be programmed with some or all of the above-described functions of the present invention.

Accordingly, a novel method and system is described for integrating network policy enforcement into an existing network infrastructure in accordance with an embodiment of the invention. From the foregoing description, those skilled in the art will recognize that many other variations of the present invention are possible. In particular, while the present invention has been described as being implemented in a network environment comprising one or more connection points 106, policy devices 102 and a communication bus 104 serving various applications and endpoints, both wired and wireless, some of the logic may be distributed in other components of a network or inter-network application. Thus, the present invention is not limited by the details described. Instead, the present invention can be practiced with modifications and alterations within the spirit and scope of the appended claims.

What is claimed is:

1. A method for integrating network policy enforcement into a network infrastructure, the method comprising:

establishing a communications bus between disparate policy devices and respective connection points in a network having a network infrastructure, each disparate policy device operating outside of the network infrastructure without access to network traffic in the network and in collaboration with other disparate policy devices to coordinate determinations about network traffic in accordance with a network policy, the respective connection points operating as intermediate points in the network infrastructure and controlling network traffic in the network to enforce the network policy;

providing information about the network infrastructure to the disparate policy devices from the respective connection points via the communications bus;

receiving a report of an event from a disparate policy device in the respective connection point via the communication bus, the event having been detected in the disparate policy device in collaboration with other disparate policy devices;

generating an action in the respective connection point for controlling network traffic to enforce the network policy in response to receiving the report of the event; and wherein providing information about the network infrastructure to the disparate policy devices from the respective connection points via the communications bus includes:

receiving a probe from a disparate policy device inquiring about at least one of a topology of, connected devices in, and device behavior present in the network infrastructure; and the respective connection points sending information about the network infrastructure to the disparate policy devices in response to the probe via the communications bus.

2. The method of claim 1, further comprising:
publishing a universal interface to the communications bus to facilitate communications between the disparate policy devices and the respective connection points via the communications bus.

3. The method of claim 1, further comprising:
aggregating multiple disparate policy devices and the respective connection points via the communications bus.

4. The method of claim 1, further comprising:
aggregating multiple respective connection points and the disparate policy device via the communications bus.

5. The method of claim 1, wherein the report of the event received from the disparate policy device includes any one or more of:
a particular Internet Protocol address exhibiting behavior that qualifies as a threat to the network infrastructure, including a wireless access point;
detection of an intrusion into the network infrastructure;
detection of a presence of a security threat in the network infrastructure; and
misuse of a resource of the network infrastructure, the resource including a service available over the network infrastructure.

6. The method of claim 1, further comprising:
receiving the report of the event from one of the respective connection points instead of receiving the report of the event from the disparate policy device.

7. The method of claim 1, wherein the action generated to enforce policy includes any one or more of:
an access control list (ACL) to block traffic associated with the reported event, including conditional blocking of specific types of traffic based on a filter;
remediation of a device associated with the reported event; and
bandwidth limitation of traffic associated with the reported event.

8. An article of manufacture comprising:
a non-transitory computer readable medium including instructions that, when executed on a connection point in a network having a network infrastructure, cause the connection point to:
establish a communications bus between disparate policy devices and their respective connection points, each disparate policy device operating outside of the network infrastructure without access to network traffic in the network and in collaboration with other disparate policy devices to coordinate determinations about network traffic in a network in accordance with a network policy, the respective connection points operating as intermediate points in the network infrastructure and controlling network traffic in the network to enforce the network policy;
provide information about the network infrastructure to the disparate policy devices from the respective connection points via the communications bus;
receive a report of an event from a disparate policy device in the respective connection point via the communication bus, the event having been detected in the disparate policy device in collaboration with other disparate policy devices;
generate an action in the respective connection point for controlling network traffic to enforce the network policy in response to receiving the report of the event;
receive a probe from a disparate policy device inquiring about at least one of a topology of, connected devices in, and device behavior present in the network infrastructure; and
respond to the probe via the communications bus, sending information about the network infrastructure from the respective connection points to the disparate policy devices.

9. The article of manufacture of claim 8, wherein the instructions, when executed on the connection point, further cause the network to:
publish a universal interface to the communications bus to facilitate communications between the disparate policy devices and the respective connection points via the communications bus.

10. The article of manufacture of claim 8, wherein the instructions, when executed on the connection point, further cause the network to:
aggregate multiple policy devices and the respective connection points via the communications bus.

11. The article of manufacture of claim 8, wherein the instructions, when executed on the connection point, further cause the network to:
aggregate multiple respective connection points and the disparate policy devices via the communications bus.

12. The article of manufacture of claim 8, wherein the report of the event, includes any one or more of:
a particular Internet Protocol address exhibiting behavior that qualifies as a threat to the network infrastructure, including a wireless access point;
detection of an intrusion into the network infrastructure;
detection of a presence of a security threat in the network infrastructure; and
misuse of a resource of the network infrastructure, the resource including a service available over the network infrastructure.

13. The article of manufacture of claim 8, wherein the action generated to enforce policy includes any one or more of:
an access control list (ACL) to block traffic associated with the reported event, including conditional blocking of specific types of traffic based on a filter;
remediation of a device associated with the reported event; and
bandwidth limitation of traffic associated with the reported event.

* * * * *